United States Patent
Pullen

(10) Patent No.: US 6,404,097 B1
(45) Date of Patent: Jun. 11, 2002

(54) ROTARY ELECTRICAL MACHINES

(75) Inventor: Keith Robert Pullen, Acton (GB)

(73) Assignee: The Turbo Genset Company, Ltd. (GB)

(*) Notice: Subject to any disclaimer, the term of this patent is extended or adjusted under 35 U.S.C. 154(b) by 0 days.

(21) Appl. No.: 09/673,857
(22) PCT Filed: Apr. 23, 1999
(86) PCT No.: PCT/GB99/01254
§ 371 (c)(1),
(2), (4) Date: Feb. 1, 2001
(87) PCT Pub. No.: WO99/56380
PCT Pub. Date: Nov. 4, 1999

(30) Foreign Application Priority Data

Apr. 23, 1998 (GB) .............................................. 9808721
Dec. 1, 1998 (GB) .............................................. 9826365

(51) Int. Cl.$^7$ ................................................. H02K 1/22
(52) U.S. Cl. .......................... 310/268; 310/80; 310/191; 310/156.62; 310/156.82
(58) Field of Search .................... 310/268, 80, 68 E, 310/103, 156.12, 156.15, 156.24, 156.62, 158.82, 114, 191, 209

(56) References Cited

U.S. PATENT DOCUMENTS

| | | | | |
|---|---|---|---|---|
| 4,007,390 A | * | 2/1977 | Muller et al. ................. | 310/90 |
| 4,605,874 A | * | 8/1986 | Whiteley ..................... | 310/268 |
| 5,057,728 A | * | 10/1991 | Dammeyer et al. ........... | 310/77 |
| 5,125,283 A | * | 6/1992 | Muramatsu ................. | 74/411.5 |
| 5,646,467 A | * | 7/1997 | Floresta et al. ............. | 310/268 |
| 5,719,459 A | * | 2/1998 | Hasegawa .................... | 310/268 |
| 6,005,317 A | * | 12/1999 | Lamb .......................... | 310/103 |
| 6,337,527 B2 | * | 1/2002 | Lamb .......................... | 310/92 |

* cited by examiner

Primary Examiner—Nestor Ramirez
Assistant Examiner—Thanh Lam
(74) Attorney, Agent, or Firm—Kaplan & Gilman, L.L.P.

(57) ABSTRACT

A rotary electrical machine comprising a stator (10) and at least one rotor (12) having a plurality of permanent magnets (14). The rotor consists of a rotor disc, at the outer edge of which the permanent magnets are mounted. The rotor disc (12) is provided with airgap varying means (19) which are angled towards the stator (10) and mounted on the rotor hub (24) for rotation therewith. When the rotor is stationary, the airgap (30) between the magnets (14) and the stator (10) is at a minimum. In operation, as the speed of rotation of the rotor (12) increases, a centrifugal force is generated which acts to bend the airgap varying means (19) and, therefore, the rotor disc (12) back, away from the stator (10), thereby drawing the magnets (14) away from the stator and increasing the size of the airgap (30). The increase in size of the airgap results in a corresponding decrease in flux and therefore a decrease in the maximum output voltage for that rotor speed. In this way, the output voltage of the machine is kept substantially constant. A stationary iron ring (32) may be provided on the stator (10) to assist in drawing away flux as the size of the airgap is increased.

26 Claims, 5 Drawing Sheets

ROTARY ELECTRICAL MACHINES

The present invention relates to a rotary electrical machine of the kind in which a plurality of permanent magnets are arranged around a rotor and a stator is provided with appropriate electrical windings. Such machines can act as electrical motors, i.e. produce rotary motion upon application of electricity to the stator windings. Alternatively, they can perform as electrical generators, i.e. alternators or dynamos, wherein rotary motion imparted to the rotor can produce an electrical output from the stator windings.

Machines of the aforementioned kind can be embodied in relatively compact efficient units. One application where small size, and high efficiency is called for is in automotive generators, for example automobile alternators. Many different alternator designs have been proposed since the inception of the internal combustion engine. One such proposal is disclosed in UK patent specification number GB-A-2 174 252.

However, the constant demand for reduction in manufacturing costs, less consumption of raw materials, lightweight components, etc., means that there is a need for even smaller and more efficient lightweight alternators.

A number of arrangements have been proposed for generating the field using permanent magnets instead of rotor field windings. This is particularly attractive now that high flux rare earth Neodymium Boron Iron magnets are available at a relatively low cost. One such arrangement is described in International patent application number PCT/GB96/01293, which relates to a rotor for an electrical machine, the rotor comprising a plurality of equi-angularly spaced magnets. The elimination of the field windings reduces the complexity of the machine in removing the need for slip rings, thereby also increasing the reliability of the machine. Since no field current is required, losses are reduced and efficiency is increased to up to twice that of a conventional claw pole device under typical operating conditions. Furthermore, in general, the power-to-weight ratio of a permanent magnet excited machine is much greater than that of the conventional claw pole machine, thereby enabling a much smaller, lower weight machine to be used for similar applications.

However, some difficulties have been encountered in the regulation of the voltage output of permanent magnet machines. Since the voltage is proportional to the speed of rotation of the rotor, the speed ratio often being as high as 10:1, any regulation means must be able to cope with a high voltage as well as having to regulate the full output current. The output voltage must be over the minimum supply voltage at the lowest speed, so that the voltage at the highest speed will be at least ten times this value, which can also have an adverse effect on the safety of the machine. In the arrangement described in International patent application number PCT/GB96/01293, the voltage is regulated by electronic means.

In the case of a conventional claw pole machine, voltage regulation is achieved by varying the field current (flowing in the rotor field windings) which causes a corresponding variation in the field strength. This has two main benefits. Firstly, since the field current is a fraction of the full output current, a relatively low cost regulator can be used.

Another problem associated with permanent magnet machines which may arise is the generation of excessive eddy currents, which in turn could cause unacceptably high levels of heat loss in the machine. The level of eddy currents is approximately proportional to the square of speed and the square of flux density. For a permanent magnet machine where the flux is at a constant value, the eddy current losses increase with the square of speed, hence finely stranded conductors are necessary to avoid excessive losses at high speeds. The use of finely stranded stator conductors substantially reduces the conductor copper density and, therefore, the power output at a given speed. Thus, because the copper packing density of the stator is reduced, a larger less efficient machine is required for a given power output. Furthermore, the use of finely stranded stator conductors results in poor heat transfer in the stator, such that the stator temperature is relatively high resulting in an unacceptably low power output, especially at high temperatures.

However, in the case of the claw pole machine, eddy currents are not substantially increased by an increase in speed because the flux density in a claw pole machine falls in response to an increase in speed.

In summary, therefore, although conventional permanent magnet machines are significantly more efficient and of lower weight than the claw pole machine, the difficulty in regulation often outweighs the benefits gained, particularly in high speed applications. This difficulty is quantified in terms of the cost of the regulation electronics and the weight and size of the machine.

It is an object of the present invention to provide an electrical machine having a rotor and a stator, the rotor comprising at least one magnet which is located adjacent to the stator with an air gap therebetween, the machine comprising means for varying the size of said air gap in response to a variation in the speed of rotation of said rotor.

At the lowest speed of rotation of the rotor, the air gap is of minimum size and the magnet is located as close as possible to the stator. Thus, the flux density is at a maximum level and a maximum voltage is generated. As the speed of rotation increases, the voltage generated should increase. However, as the speed of rotation increases, the magnet is moved away from the stator, thereby increasing the size of the air gap and decreasing the flux density at that speed. Thus, the otherwise increased voltage is compensated by increasing the size of the air gap, and the output voltage remains substantially constant. Thus, the need for complex and expensive circuitry to regulate the output voltage is substantially eliminated. Even if additional circuitry is required to assist in the voltage regulation, such regulating electronics would be relatively simple and less expensive than the circuitry required for voltage regulation in conventional permanent magnet machines.

Furthermore, as stated above, the level of eddy currents generated in the stator is proportional to the square of the frequency and the square of the flux density. As the speed of rotation increases, obviously the frequency increases accordingly. However, the flux density is reduced by the increase in size of the air gap, thereby compensating for the increase in flux density. In this way, any increase in eddy currents with the increased speed of rotation is substantially eliminated. In fact, because of this it is not necessary to use finely stranded conductors in the stator. Instead, the stator can be formed of copper sheeting, onto which the wiring pattern is etched, stamped out, or cut by other means, e.g. laser or water jet. As a result, the heat transfer characteristics of the stator are good because the copper packing density of the stator is high. Thus, the size of the machine required to give a particular power output can be reduced, and the cost of manufacture is also reduced. At higher speeds, high eddy current losses do not occur since the drop in field strength due to the increased air gap would compensate for the increase in frequency.

The size of the stator, and therefore the overall machine, can be further reduced by the addition of ferromagnetic material typically laminated soft iron therein, to assist in drawing more of the flux into the stator coils, thereby increasing the voltage generated. Furthermore, as the airgap increases, the flux going through the stator can be reduced by increasing the flux leakage. One or more rings of additional stationary iron of a particular shape may be placed in such a way as to assist the leakage of flux going away the stator coils. This has two main benefits: (i) the maximum movement of the rotor(s) is reduced; and (ii) the design the means for varying the airgap is easier, since the iron ring shape can be tuned to give the required voltage regulation.

The use of iron in the stator used in the present invention is permissible, because iron losses are not significantly increased at high speeds due to the resultant drop in field strength.

Thus, the machine of the present invention may comprise one or more stationary metal rings, preferably formed of iron, which is/are mounted concentrically with the stator with substantially no space therebetween. Alternatively, a stationary iron ring may be formed integrally with the stator. In a preferred embodiment, as the at least one magnet is drawn away from the stator and the airgap is increased, the at least one magnet is drawn closer to the stationary iron ring which assists in drawing away flux, thereby increasing the effectiveness of the regulation process. Furthermore, since the maximum airgap does not have to be so large, the compactness of the machine is also improved. The diameter of the iron ring(s) may be less than that of the stator. However, in a preferred embodiment the diameter thereof is greater than that of the stator. Soft iron inserts may also be placed in the stator to increase the voltage generated in the stator coils.

The means for varying the airgap preferably comprises one or more resiliently flexible members formed integrally with or mounted on the rotor, the resiliently flexible member co-operating with a respective magnet of the rotor so that, as the speed of rotation of the rotor increases the centrifugal force generated thereby causes movement of the resiliently flexible member or members and thereby draws the or each respective magnet away from the stator to increase the airgap. In a preferred embodiment, the rotor comprises a plurality of equi-angularly spaced magnets.

The means for varying the airgap is preferably mounted or biased such that when the rotor is stationary or at its lowest operating speed, the airgap is at a minimum. In one embodiment, the means for varying the airgap may comprise one or more members supported on a rotor drive shaft, the member or members being angled to be progressively closer to the stator with increasing radial distance from the drive shaft. In this case, an increase in rotor speed results in a centrifugal force to draw the angled portion of the airgap varying means back to a substantially vertical position at maximum rotor speed. For the avoidance of doubt, the term "progressively" is not intended to mean only linear. The angled portion of the airgap varying means may, for example, be curved or stepped.

The machine may further comprise electronic means for additional voltage regulation. Because a large proportion of the voltage regulation is achieved by mechanical means, the electronic circuitry required for any additional voltage regulation is substantially simplified. Additional mechanical means, for example flyweights, may also be provided for assisting in drawing the magnets away from the stator to increase the airgap.

When current is drawn from the machine by a load, there is a corresponding drop in output voltage for a particular rotor speed. As the rotor speed itself is unchanged, such a voltage drop is not compensated for by the airgap varying means. Thus, in a preferred embodiment of the present invention, feedback means are provided for feeding back a portion of the output current to, for example, a solenoid which operates to push the at least one magnet back towards the stator and decrease the airgap by an amount corresponding to the drop in output voltage at that rotor speed.

According to another aspect of the present invention there is provided a stator for an electrical machine, the stator comprising electrical windings arranged as coil sectors disposed substantially equi-angularly in a generally circular pattern on two opposing sides of the stator, wherein at least some of the coil sectors are wound in a generally spiral fashion when viewed in the direction of the axis of symmetry of said generally circular pattern, characterised in that at least two of the coil sectors, one on each of the two opposing sides of the stator, are formed of a continuous electrical winding which passes through the stator from one side to the other side.

Alternatively, regulation which is necessary in order to compensate for changes in voltage according to changes in load may be carried out entirely by electronic means, such as, for example, a DC to DC converter placed after the voltage rectifier or a controlled rectifier.

An embodiment of the present invention will now be described by way of example only and with reference to the accompanying drawings in which.

Figure 1:
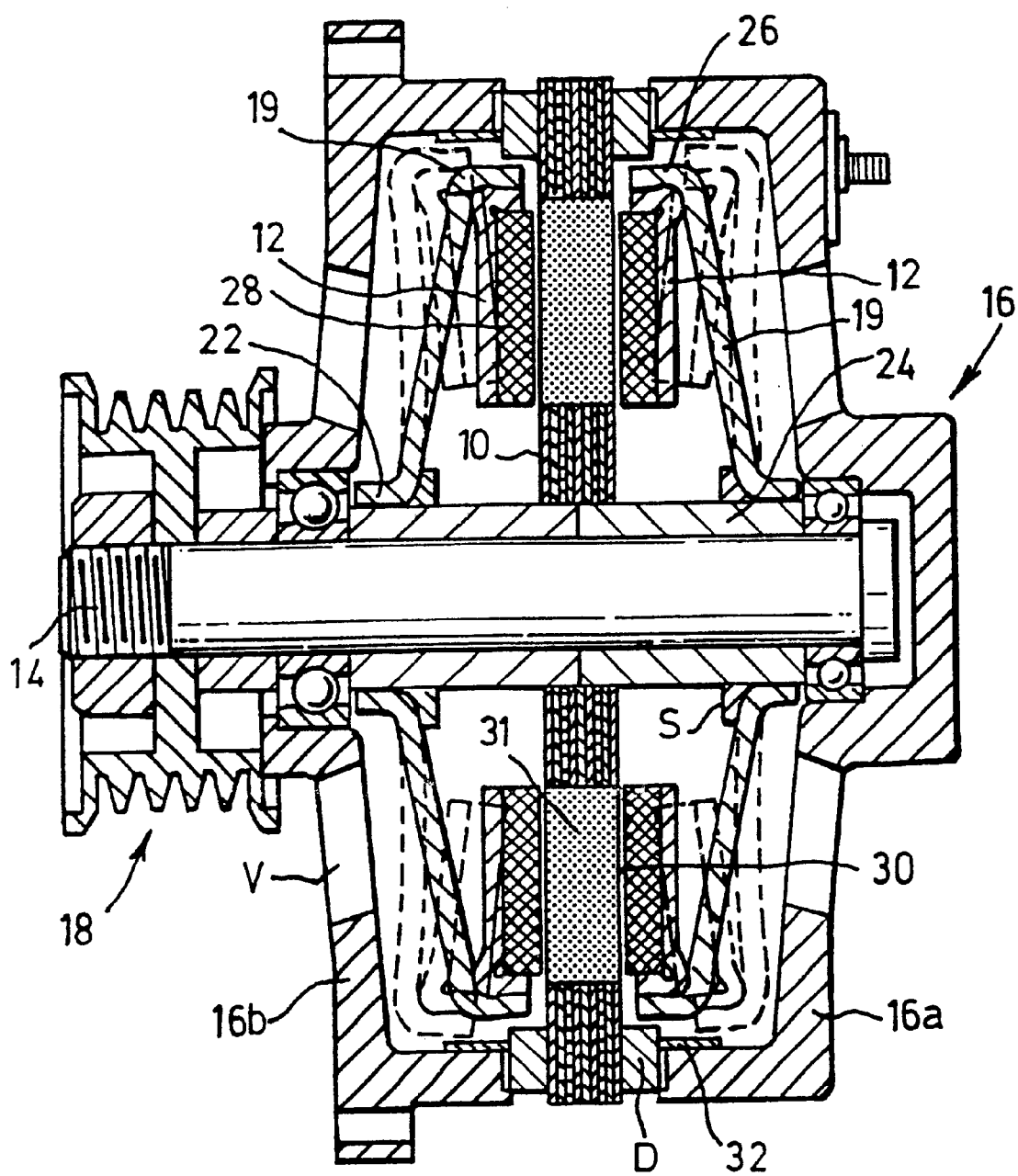
FIG. 1 is a schematic crosssectonal view of a single stage of a generator according embodiment of the invention.

Referring to FIG. 1 of the drawings, a generator according to an embodiment of the invention comprises a generally disc-shaped stator 10 mounted between two concentric rotor discs 12. The stator 10 and the rotor discs 12 each have an opening to receive a central spindle or shaft 14. The stator 10 and the rotor discs 12 are mounted in a casing 16 formed of two halves 16a, 16b. The spindle or shaft 14 as it emerges from the casing 16 is provided with a pulley 18 for a drive belt (not shown).

Figure 4:
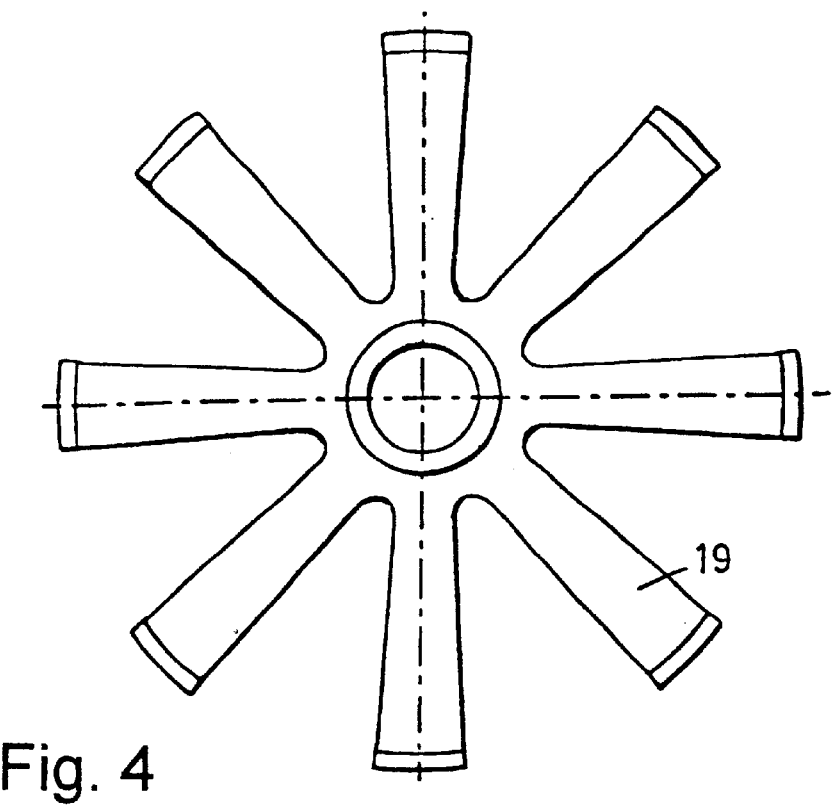
FIG. 4 is a side view of airgap varying means of the generator of FIG. 1.

Each rotor disc 12 is provided with a "spider"-shaped airgap varying means 19 which is formed integrally with or fixed to the rotor disc 12. Each airgap varying means 19 is formed of a resiliently flexible material, and is bolted or otherwise fixed via a flange-like mounting portion 22 to a rotor hub 24 which co-operates with the spindle or shaft 14. A side view of the airgap varying means is shown in FIG. 4 of the drawings.

Figure 3:
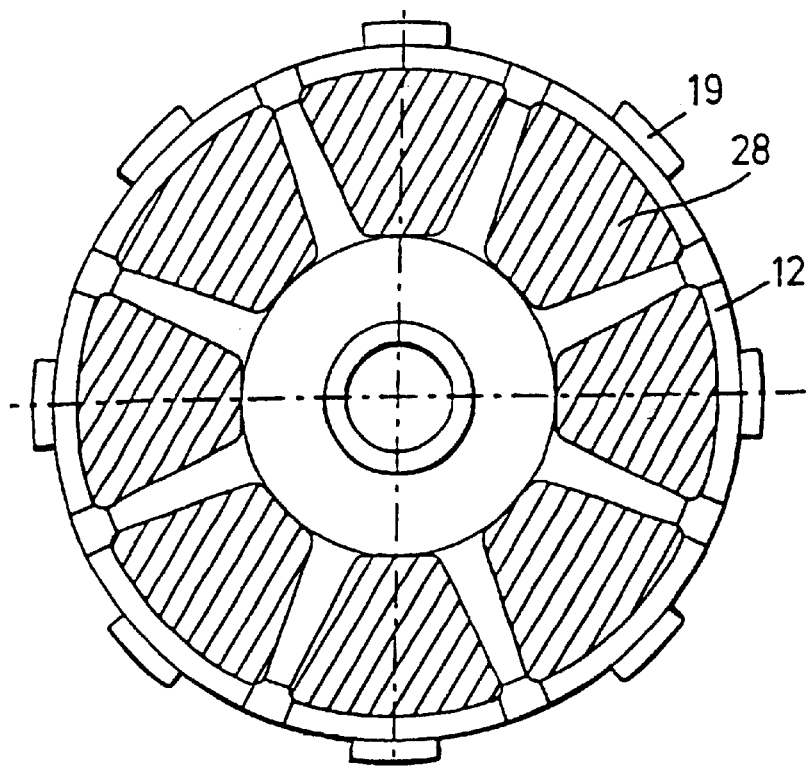
FIG. 3 is a side view of the rotor disc of the generator of FIG. 1.

The outer edge of each airgap varying means 19 is bent or curved inwards so as to form a generally flat, flange-like portion 26. A plurality of equi-angularly spaced permanent magnets 28 are mounted, by means of adhesive or otherwise, close to the outer edges of the rotor discs 12, facing the stator 12. A side view of the rotor disc and magnets is shown in FIG. 3 of the drawings. Referring back to FIG. 1, when the rotor is stationary, the air gap 30 between the magnets 28 and the stator 10 is at a minimum, and the plane of the magnets is substantially parallel with that of the stator 10. A stop 5 may be provided, if required, to prevent the rotor going too close to the stator. Cooling airflow shown by the arrows is drawn into the machine through vents V and is pumped outwards by the rotor before leaving through a finned disc D.

Figure 2A:
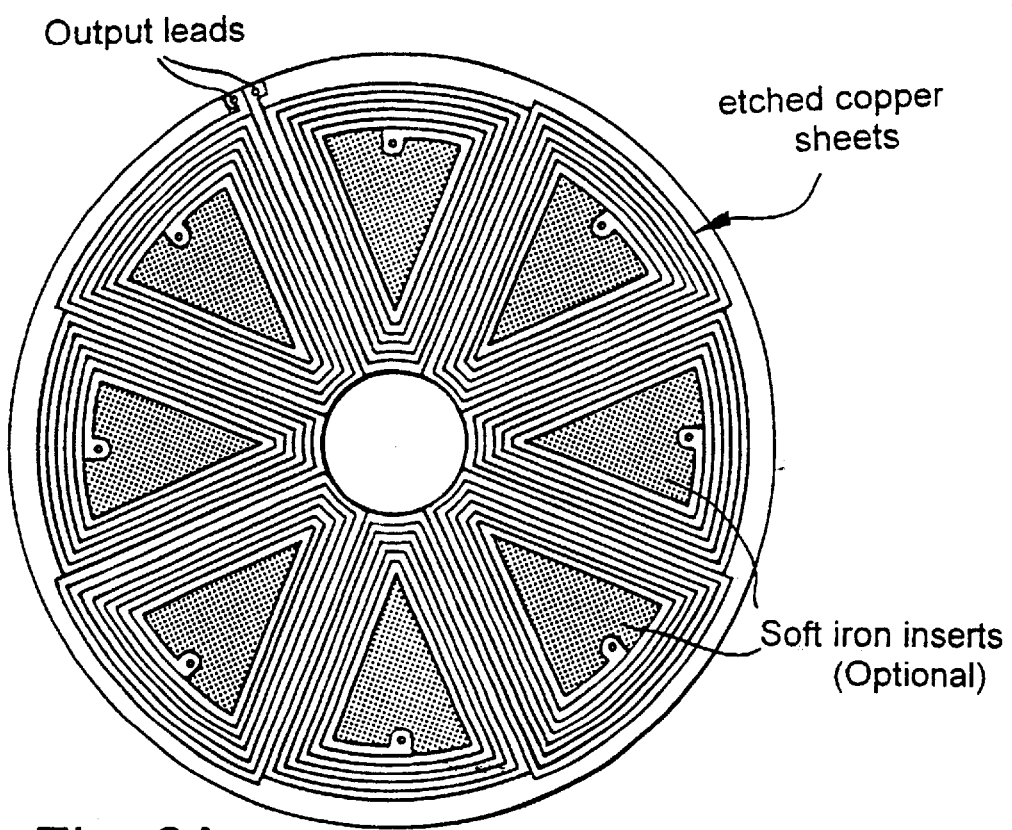
FIG. 2A is a front view of a stator for use in the generator of FIG. 1.
Figure 2B:
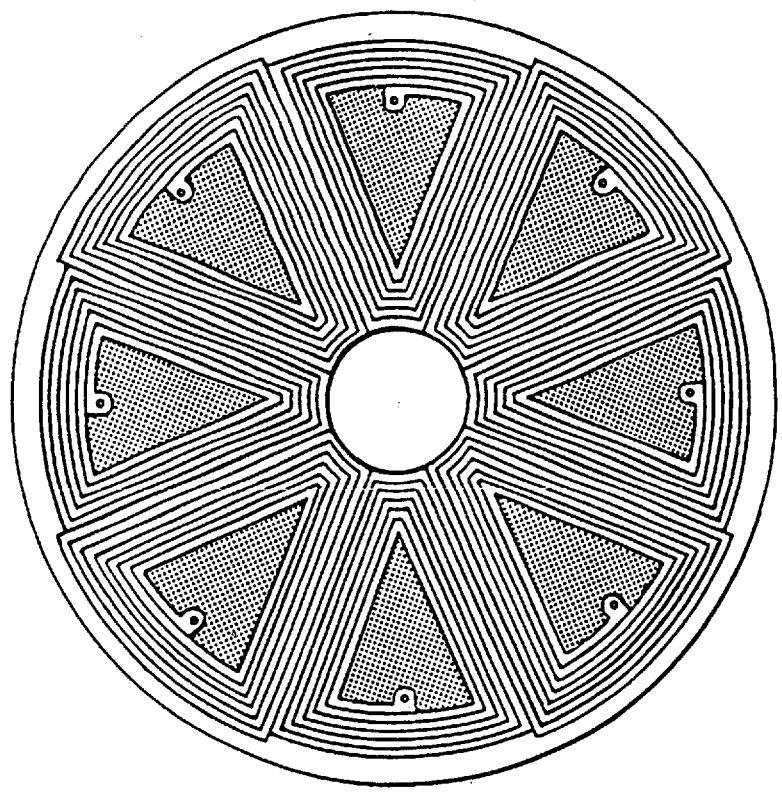
FIG. 2B is a rear view of the stator of FIG. 2A.

The stator 10 comprises a generally disc-shaped solid copper sheet, onto which stator windings 29 have been etched using known techniques. Soft iron inserts 31 are provided to increase the voltage generated in the stator coils, as shown in FIGS. 2A and 2B of the drawings.

Referring back to FIG. 1, the generator further comprises a stationary iron ring 32 which is mounted within the casing 16, concentric with the stator 10 and with no gap therebetween. In FIG. 1, the iron ring 32 is shown as having a diameter greater than that of the stator 10 for optimum efficiency. However, it is envisaged that its diameter could be less than that of the stator 10.

In use, at minimum rotor speed, the air gap 30 between the rotor magnets 28 and the stator 10 is at a minimum of, for example, 10 mm. Thus, the magnetic flux density is at a maximum for a minimum allowed rotor/stator clearance and the output voltage, which is proportional to the flux density, is at a maximum for that rotor speed.

As the speed of rotation of the rotor increases, the centrifugal force generated causes the airgap varying means 19 and, therefore, the rotor discs 12 to bend from the mounting portion 22 outwards so that the magnets 28 are drawn away from the stator 10, thereby increasing the air gap 30, as shown by the broken lines in FIG. 1.

As the size of the air gap so increases, the flux density decreases which causes a compensating decrease in output voltage for that rotor speed. As an example, if the air gap 30 is increased from 10 mm to 30 mm, the flux typically falls by a factor of about 10. Thus, by varying the size of the air gap as a function of rotor speed, the output voltage is substantially constant.

As shown in FIG. 1, due to the angled shape of the rotor discs 12, as they are drawn backwards, the main angled section of the discs 12 tends towards a vertical position, thereby drawing the magnets 28 away from the stator 10 and upwards towards the stationary iron ring 32. As the magnets 28 approach the iron ring 32, some of the flux is drawn away by the iron ring 32, thereby assisting in the corresponding decrease in output voltage. There are two main advantages of this. Firstly, of course, voltage regulation in response to an increase in rotor speed is quicker, thereby providing a more constant output voltage. Secondly, the maximum air gap required can be smaller, thereby improving the compactness of the machine. It has previously been less advantageous to use iron in the stator because of the resulting iron losses. However, iron losses are approximately proportional to speed and field strength. In the machine of the present invention, the field strength decreases as the speed increases, thereby cancelling out any additional iron losses which would otherwise occur at high rotor speeds.

A subsequent decrease in rotor speed reduces the magnitude of the centrifugal force generated and allows the magnets to be released accordingly back towards the stator 10 to decrease the size of the air gap 30.

When current is drawn from the generator by a load (not shown), there is a corresponding decrease in output voltage. In order to compensate for this, a solenoid (not shown) may be provided through which a small portion of the output current is fed back, in response to which the magnets 28 are pushed back towards the stator to decrease the air gap by an amount proportional to the load current, and provide a corresponding increase in output voltage to compensate for the voltage drop caused by the load.

It is also envisaged to provide additional mechanical means to assist in moving the magnets, or electronic means for additional voltage regulation. Such electronic voltage regulation means would be simple and less expensive relative to a fixed rotor device because most of the voltage regulation is carried out by variation of the air gap.

The air gap 30 between the rotor 12 and the stator 10 should be in the range of 8 to 12 mm for best power output performance, in the case where no iron is present in the stator. If iron is present, the optimum gap size would be greater. If the airgap size is increased, the flux goes down sharply but more current can be drawn from the resulting thicker stator. If the gap is smaller than the minimum, the resulting low stator thickness does not allow much current to be drawn and hence output is low. If the gap is larger than the maximum, the resulting higher stator thickness allows a high current to be drawn, but the voltage will be low since the flux is low. Power is of course the product of current and voltage.

Figure 5A:
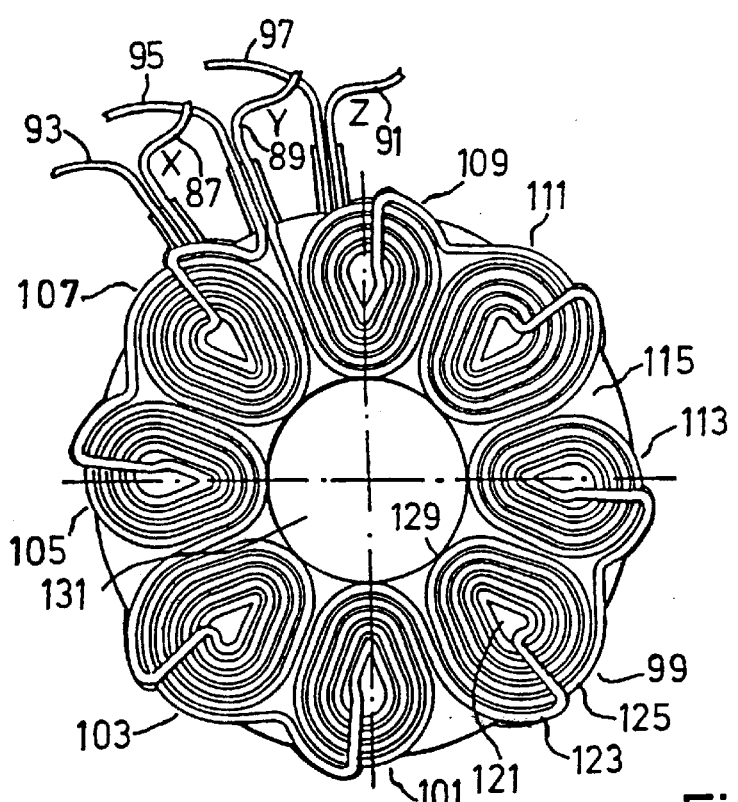
FIG. 5A shows a plan view from one side.
Figure 5B:
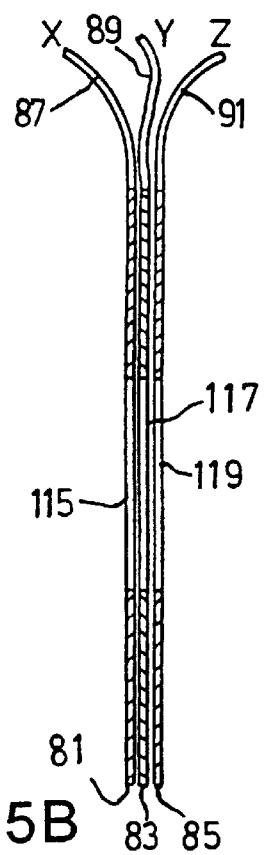
FIG. 5B shows an axial cross-section, section
Figure 5C:
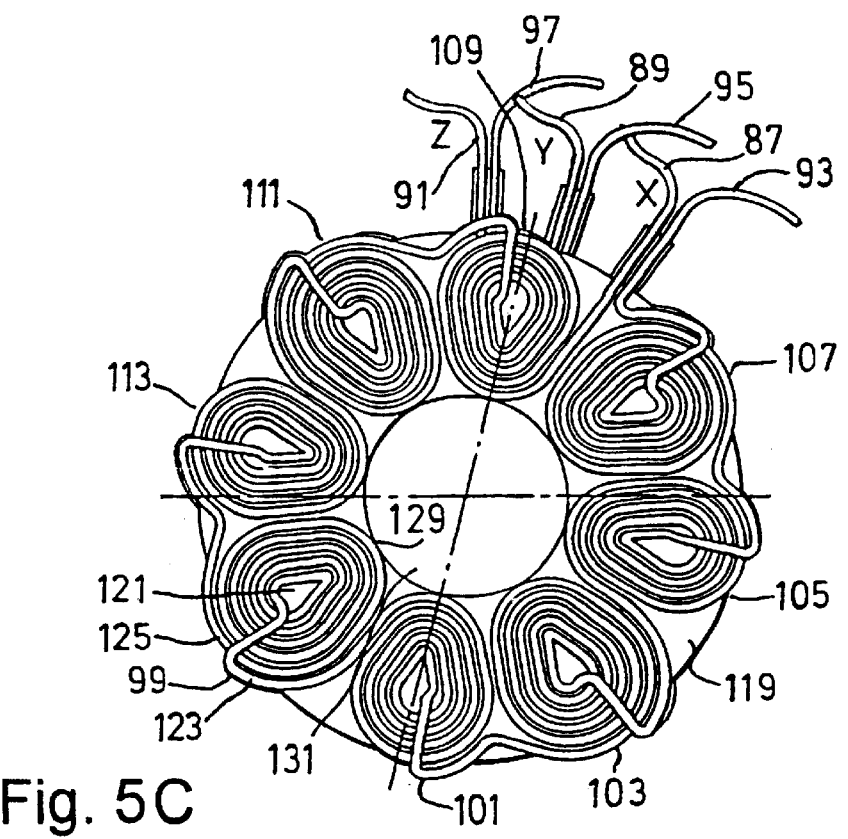
FIG. 5C shows a plan view from the other side of the coil windings of an alternative construction formed using stranded wire (soft iron inserts not shown)

A suitable stator winding assembly, particularly suitable for high speed machines, is shown in FIGS. 5A to 5C.

The windings are made in three plans 81, 83, 85 overlapping relative to the axis and each is provided with a respective connection 87, 89, 91 (with respective counter connections 93, 95, 97) for a three-phase electrical output (denoted X, Y, Z).

The windings are each formed into eight respective coil sectors (99, 101, 103, 105, 107, 109, 111, 113). It would be appreciated that each set of windings in the respective plans 81, 83, 85 are formed on or within respective laminar supports 115, 117, 119.

Each coil sector 99, etc. is the same shape. For convenience, this will be described here only with reference to one such sector 99. The sector is generally spiral in shape with the wiring spiralling from the middle 121 to the periphery 123 thereof. The radially outermost part 125 adjacent the stator periphery 127 is generally rounded. The innermost part 129 adjacent the opening 131 is inwardly pinched.

This type of stator winding assembly is described and claimed in PCT application no. PCT/GB96/01292.

Obviously, the stator winding assembly shown in FIGS. 5A to 5C use a cross-over wire which links the inner spiral coil to the outer spiral coil. This design is generally one layer of wire thick, but is two layers thick at the cross-over. Therefore, when the windings are compacted, the cross-over wire is crushed, which weakens the design at that point. There is also the problem of possible short-circuit.

An alternative design can be considered, particularly but not necessarily for lower speed machines. Referring to FIGS. 2A and 2B, and 6A and 6B. In this design, a coil is formed on one side of the stator, and the wire is then passed through an aperture in the centre of the coil to the other side of the stator where it is formed into a second coil this is repeated for each set of two coils, as shown, the final arrangement of 8 coils on each side of the stator being formed of a single winding. This design has obvious advantages over the cross-over design, in that there is no cross-over wire, thereby eliminating the problems caused by compaction of the cross-over design.

In the case of both stator winding assemblies, the coils can be formed of litz wire, which can be compacted.

Figure 6A:
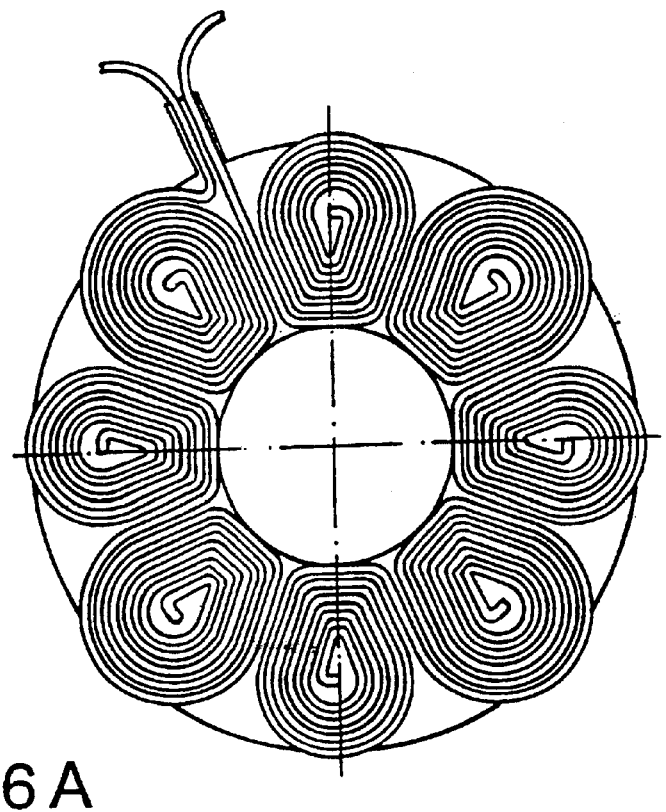
FIG. 6A shows a plan view from one side.
Figure 6B:
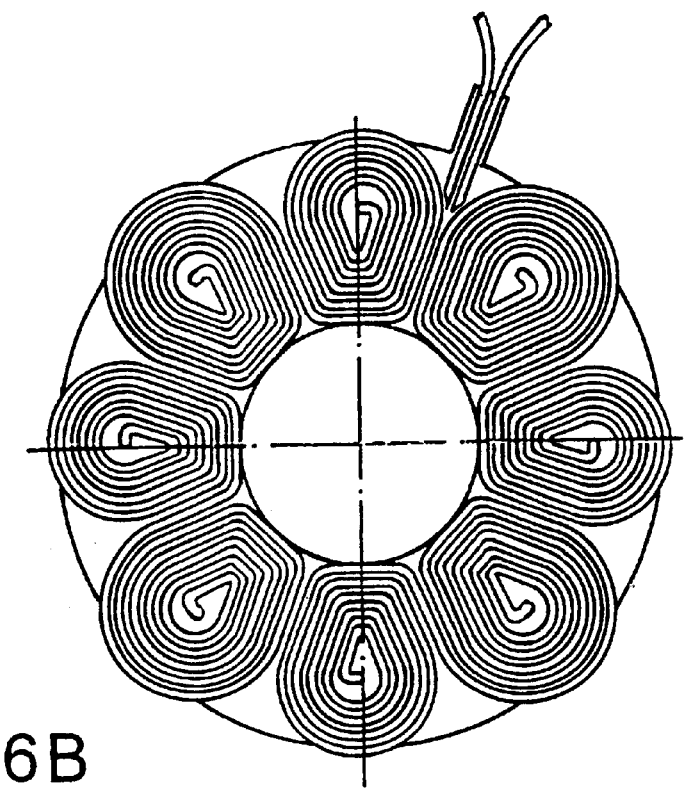
FIG. 6B shows a plan view from side of the coil windings of another stator suitable for use in a generator according to the present invention (soft iron inserts not shown).

However, the assembly shown in FIGS. 6A and 6B could also be formed of etched copper windings, particularly in lower speed machines having relatively low frequencies. Copper cannot be used for the cross-over design because it is solid and cannot be sufficiently compacted.

In the light of this disclosure, modifications of the described embodiment, as well as other embodiments, all within the scope of the invention, will now become apparent to persons skilled in the art.

What is claimed is:

1. An electrical machine having a rotor and a stator, the rotor comprising at least one magnet which is located adjacent to the stator with an airgap therebetween, the machine comprising a resiliently flexible member formed integrally with or mounted on the rotor, the resiliently flexible member co-operating with the at least one magnet, wherein as the speed of rotation of the rotor increases, the centrifugal force generated thereby causes the resiliently flexible member to deflect such that the at least one magnet is drawn away from the stator to increase the airgap.

2. A machine according to claim 1, comprising a plurality of said resiliently flexible members, each co-operating with a respective magnet of the rotor.

3. A machine according to claim 2, wherein the rotor comprises a plurality of equi-angularly spaced magnets, said plurality of resiliently flexible members being substantially equi-angularly spaced.

4. A machine according to claim 1, further comprising a stationary metal ring which is mounted concentrically with the stator, wherein when the airgap is increased in response to an increase in speed of rotation of the rotor, the at least one magnet is moved closer to the stationary metal ring.

5. A machine according to claim 4, wherein said stationary metal ring is formed of iron.

6. A machine according to claim 4, wherein the diameter of the metal ring is less than that of the stator.

7. A machine according to claim 4, wherein the diameter of the metal ring is greater than that of the stator.

8. A machine according to claim 1, further comprising a stationary metal ring which is formed integrally with the stator, wherein when the airgap is increased in response to an increase in speed of rotation of the rotor, the at lease one magnet is moved closer to the stationary metal ring.

9. A machine according to claim 8, wherein said stationary metal ring is formed of iron.

10. A machine according to claim 8, wherein the diameter of the metal ring is less than that of the stator.

11. A machine according to claim 8, wherein the diameter of the metal ring is greater than that of the stator.

12. A machine according to claim 1, wherein the means for varying the airgap is preferably mounted or biased such that when the rotor is stationary or at its lowest operating speed the airgap is at a minimum.

13. A machine according to claim 12, wherein the means for varying the airgap comprises one or more members supported on a rotor drive shaft, the member or members being angled to be progressively closer to the stator with increasing radial distance from the drive shaft.

14. A machine according to claim 13, wherein the means for varying the airgap is arranged such that an increase in rotor speed which results in a centrifugal force which draws the angled portion of the airgap varying means back to a substantially vertical position at maximum rotor speed.

15. A machine according to claim 1, comprising electronic means for additional voltage regulation.

16. A machine according to claim 1, wherein the means for varying the airgap comprises electronic means.

17. A machine according to claim 1, comprising additional mechanical means for assisting in drawing the at least one magnet away from the stator to increase the airgap.

18. A machine according to claim 17, wherein said additional mechanical means comprises flyweights.

19. A machine according to claim 1, wherein said rotor includes a plurality of equi-angularly spaced magnets.

20. A machine according to claim 1, further comprising feedback means for feeding back at least a portion of the output current to means which operate in response to said output current to push the at least one magnet back towards the stator and decrease the size of the airgap by an amount corresponding to the value of output current drawn by a load.

21. A machine according to claim 20, wherein said means for pushing the at least one magnet back towards the stator includes a solenoid.

22. A machine according to claim 1, wherein the stator includes inserts formed of a ferromagnetic material.

23. A machine according to claim 22, wherein said inserts are formed of soft iron.

24. A method of regulating the output voltage of a machine having a rotor and a stator, the rotor comprising at lease one magnet which is located adjacent to the stator with an airgap therebetween, the method including the step of varying the size of said airgap in response to a variation in the speed of rotation of the rotor, using a resiliently flexible member formed integrally with or mounted on the rotor, the resiliently flexible member co-operating with the at least one magnet, wherein as the speed of rotation of the rotor increases, the centrifugal force generated thereby causes the resiliently flexible member to deflect such that the at least one magnet is drawn away from the stator to increase the airgap.

25. A method according to claim 24, including the step of additionally regulating the output voltage of the machine by electronic means.

26. A method according to claim 25, including the step of feeding back at least a portion of output current drawing from the machine by a load to means which operate in response to said output current to push the at least one magnet back towards the stator, thereby decreasing the size of the airgap by an amount corresponding to the value of output current drawn by the load.

* * * * *